July 24, 1934.  J. F. WALLACE  1,967,640
SHOCK ABSORBING STRUT
Original Filed Feb. 15, 1928
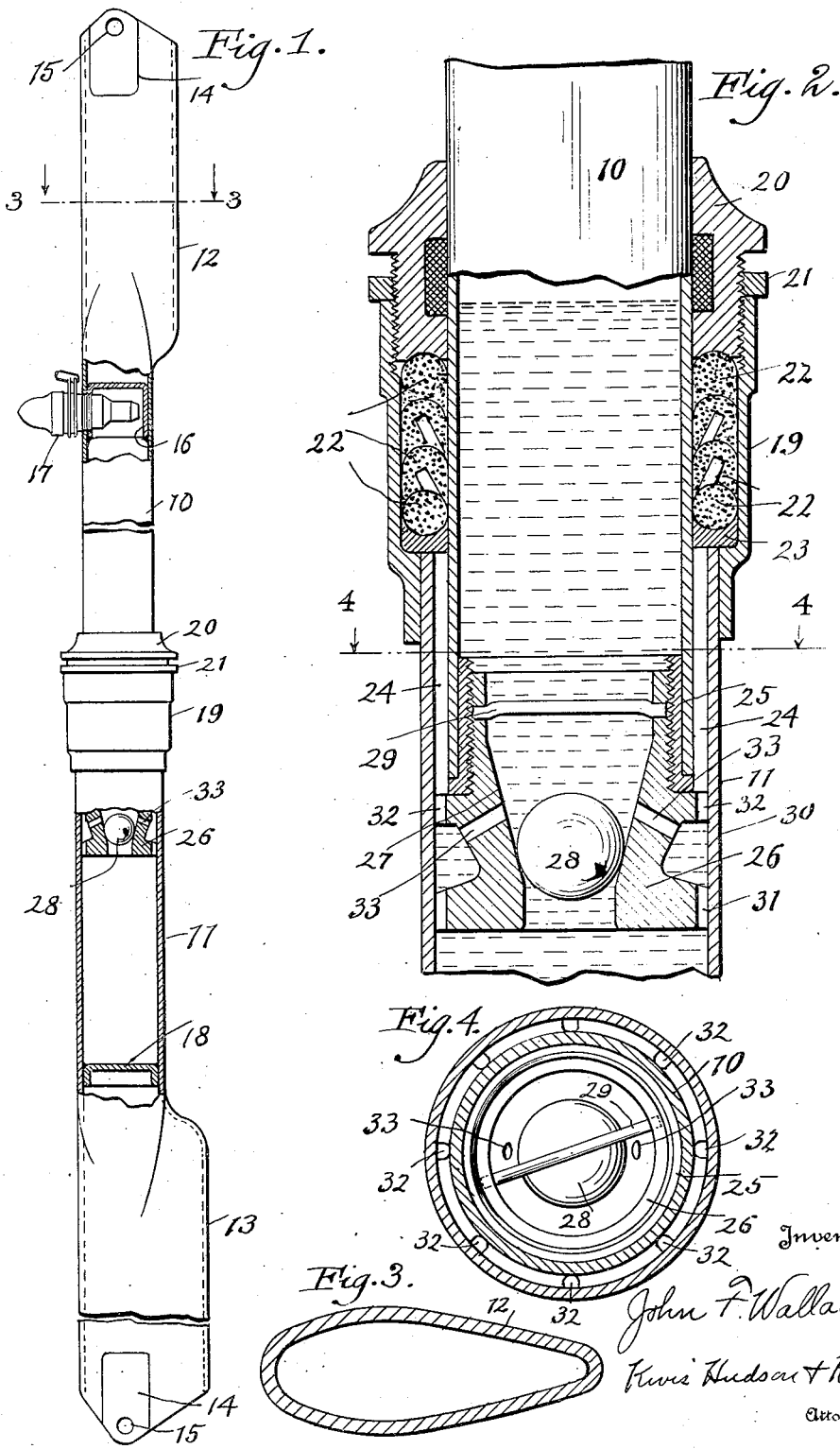

Patented July 24, 1934

1,967,640

UNITED STATES PATENT OFFICE 1,967,640

SHOCK ABSORBING STRUT

John F. Wallace, Shaker Heights, Ohio, assignor to The Cleveland Pneumatic Tool Company, Cleveland, Ohio, a corporation of Ohio Application February 15, 1928, Serial No. 254,325
Renewed October 12, 1933

6 Claims. (Cl. 267—64)

This invention relates to improvements in shock absorbing struts for use primarily in the landing gears of aircraft, although features of the invention are susceptible of use also in land vehicles.

One of the objects of the invention is the simplification of devices of this character with the advantageous results of reduction in manufacturing costs and reduction in weight.

Another object is the provision of a very simple and effective valve construction between the two chambers of the strut for permitting the free transfer of fluid in one direction and interposing an obstacle to its flow in the opposite direction for checking the rebound.

Still another object is the provision of telescoping tube sections, the integral outer ends of which are partially flattened into stream line form, thus doing away with sheet metal stream line covers for these parts which are unsatisfactory in service on account of becoming loose and being noisy.

Other objects and features of novelty will appear as I proceed with the description of that embodiment of the invention which, for the purposes of the present application, I have illustrated in the accompanying drawing, in which:

Fig. 1 is an elevational view partly in longitudinal section of a combination hydraulic and pneumatic strut embodying the invention;

Fig. 2 is a central longitudinal section of the middle portion of the strut showing, on a larger scale, the valve and packing;

Fig. 3 is a transverse section on a larger scale taken substantially on the line 3—3 Fig. 1; and Fig. 4 is a transverse section taken substantially on the line 4—4 Fig. 2.

In the drawing, the upper and inner member of the two parts of the strut is shown at 10 and the lower and outer member at 11. These members are preferably formed of seamless steel tube, the telescoping portions of which are left in their original cylindrical form. Beyond the telescoping portions, however, these members are flattened somewhat in order to cause them to assume the conventional stream line form, as illustrated in Fig. 3. This operation is performed in a die press with dies shaped to produce a gradual merging of the circular section into the stream line section. The stream line ends 12 and 13 may be of any length desired or necessary to suit the design and dimensions of the airplane or hydroplane with which the strut is to be used. These ends will usually be bevelled off, as shown in Fig. 1, and supplied with reinforcing plates 14. Perforations 15 are made through the ends 12, 13 and plates 14 for the reception of attaching bolts or the like.

The outer end of the cylindrical portion of the member 10 is closed by a cup-shaped plug 16, the side wall of which serves as a reinforcement for the oil filler (not shown) and the air valve 17. The outer end of the cylindrical portion of member 11 has attached thereto a packing gland 19 which is threaded for the reception of a gland nut 20. A lock nut 21 holds the two parts in relatively adjusted position. The packing mounted within the packing gland 19 is preferably in the form of rings 22, some of which may be formed in such a way that they expand radially when pressure is exerted upon them in a direction parallel to the axis of the strut. The packing 22 is a known commercial article and per se forms no part of the present invention. At one end of the gland the packing bears upon the gland nut 20 while at the other end it bears upon a retainer ring 23 which, in turn, rests normally upon the end of the cylindrical member 11 and a shouldered portion of the packing gland 19.

The outside diameter of the inner member 10 is smaller than the inside diameter of the member 11 so that a substantial clearance 24 is left between them. This is shown in the drawing as of about the thickness of the tube walls, but it may be varied more or less in practice. A tubular reinforcement 25 is secured to the inner end wall of member 10 and is interiorly threaded to take a piston head 26 that is provided with a central downwardly tapered port 27 extending entirely therethrough. A metal ball valve 28 seats itself in the tapered portion of this port, the movement of the ball out of the opening in the piston being prevented by a retaining pin 29. The piston head has a large annular groove formed therein providing a chamber 30. It also has a series of longitudinal grooves 31, 32 spaced evenly about its periphery and connecting chamber 30 with the main space inside the cylindrical member 11 and with the annular clearance space 24. The chamber 30 is further connected with the port 27 above the ball valve 28 by one or more passages 33 providing a by-pass around the valve. By varying the size or number of the passages 33 the speed and intensity of the rebound action may be controlled.

When the strut is assembled and mounted upon an airplane or the like, the two cylindrical members 10 and 11 will be telescoped together as far as they will go. The strut in this contracted condition is then filled with oil. Thereafter an air pressure line is connected with the air valve 17 and enough air under pressure is admitted to expand the strut partially, that is with the weight of the airplane upon it. Figs. 1 and 2 illustrate the parts in this relation. The air valve is then closed and the strut is ready for service.

When the weight of the plane is taken off the strut, as it will be during flight, the members 10 and 11 travel outwardly to their limit of motion, that is until the piston head engages the retaining ring 23 and moves it outwardly a slight distance, exerting pressure upon the packing rings 22 and expanding the latter to insure a very tight seal. When a landing is made a heavy blow or sudden upward impulse is put upon the lower member 11 driving it rapidly upward. The ball 28, which is normally held upon its seat by gravity, is then pushed upward by the oil beneath it and the latter flows without material interference into the space above the piston head where it compresses the air to an extent sufficient to take the shock of the landing. A large amount of energy is thus stored up in the trapped air and that energy seeks to dissipate itself by forcing the oil downward. But under this condition the ball valve 28 again seats itself immediately and the downward flow of oil is forced to proceed through the restricted opening or openings 33 and thence by way of chamber 30 and openings 31 into the space below the piston. Hence the rebound or outward travel of the cylindrical member 11 is delayed and softened. After the plane has landed and while it is taxying over the ground similar movements of the strut members take place, but they are naturally of less magnitude as the shock of landing is the greatest shock to be encountered.

It is to be noted that the annular clearance space 24 is open at all times to the pressure in the chamber 30 which is also open through passages 33 and grooves 31 to the main compartments above and below the piston head. Pressure is thus brought to bear upon the ring 23 and upon the packing rings 22 in proportion to the pressure in the annular chamber 30, and thus the sealing of the strut is automatically varied to suit conditions.

While in the accompanying drawing and in the foregoing specification I have illustrated and described somewhat in detail a specific form of the invention, such disclosure is for illustrative purposes only and is not intended to limit the invention in any way.

Having thus described my invention, I claim:

1. A hydro-pneumatic shock absorbing strut comprising a pair of telescoping cylinders, a piston head carried by the inner cylinder, said head being of a diameter slightly larger than the diameter of the inner cylinder whereby an annular space is provided between the two cylinders behind the piston head, an expansible packing carried by the inner end of the outer cylinder and bearing against the inner cylinder, said piston head having a port therethrough adapted to permit rapid movement of the fluid through the head when the strut is compressed and a valve adapted to seat in said port to interfere with the flow of fluid in the opposite direction when the strut is extended, said head also having passages on opposite sides of the seated valve for connecting said annular space with the fluid in both the inner and the outer cylinders whereby the pressure upon the expansible packing varies with the pressure in the strut.

2. A hydro-pneumatic shock absorbing strut comprising a pair of telescoping cylinders, a piston head carried by the inner cylinder, said head being of a diameter slightly larger than the diameter of the inner cylinder whereby an annular space is provided between the two cylinders behind the piston head, an expansible packing carried by the inner end of the outer cylinder and bearing against the inner cylinder, said piston head having a valved port therethrough adapted to permit rapid movement of fluid through the head when the strut is compressed and to interfere with the flow in the opposite direction when the strut is extended, said head having a chamber therein in constant restricted communication with the interior of the outer cylinder, said chamber being in communication with the said annular space and in restricted communication with the inner cylinder.

3. A hydro-pneumatic shock absorbing strut comprising a pair of telescoping cylinders, a piston head carried by the inner cylinder, said head being of a diameter slightly larger than the diameter of the inner cylinder whereby an annular space is provided between the two cylinders behind the piston head, an expansible packing carried by the inner end of the outer cylinder and bearing against the inner cylinder, said piston head having a port therethrough adapted to permit rapid flow of fluid through the piston head when the strut is compressed, a spherical valve adapted to seat itself in said port to close the same when the strut is extended, said head having a chamber therein in constant restricted communication with the interior of the outer cylinder, said chamber being in communication with said annular space and in restricted communication with the inner cylinder.

4. A hydro-pneumatic shock absorbing strut comprising a pair of telescoping cylinders, a piston head carried by the inner cylinder, said head being of a diameter slightly larger than the diameter of the inner cylinder, whereby an annular space is provided between the two cylinders behind the piston head, an expansible packing carried by the inner end of the outer cylinder and bearing against the inner cylinder, said piston head having a valved port therethrough adapted to permit rapid movement of fluid through the head when the strut is compressed and to interfere with the flow in the opposite direction when the strut is extended, said head having a chamber therein, said chamber being in communication with the outer cylinder and in restricted communication with both the inner cylinder and the said annular space.

5. A shock absorbing strut comprising two substantially axially aligned sections of hollow metal tubing, the adjacent ends of said sections being substantially cylindrical and in telescoping relation to form cooperating shock absorber elements and portions of the sections extending axially away from the telescoping portions being deformed to substantially stream line cross-sectional shape, and rigid closure means in said sections adjacent the junction of the cylindrical portions with the stream line portions.

6. A shock absorbing strut comprising two substantially axially aligned sections of hollow metal tubing, the adjacent ends of said sections being substantially cylindrical and in telescoping relation to form cooperating shock absorber elements and portions of the sections extending axially away from the telescoping portions being deformed to substantially stream line cross-sectional shape, and a plug in each cylindrical portion adjacent the outer end thereof.

JOHN F. WALLACE.